US012291152B2

(12) United States Patent
Buckley et al.

(10) Patent No.: US 12,291,152 B2
(45) Date of Patent: May 6, 2025

(54) IMAGE PROCESSING METHOD

(71) Applicant: Connaught Electronics Ltd., Tuam (IE)

(72) Inventors: Michael Buckley, Tuam (IE); Trevor Dempsey, Tuam (IE); Tony Reilly, Tuam (IE)

(73) Assignee: CONNAUGHT ELECTRONICS Ltd., Tuam (IE)

( * ) Notice: Subject to any disclaimer, the term of this patent is extended or adjusted under 35 U.S.C. 154(b) by 653 days.

(21) Appl. No.: 17/602,529

(22) PCT Filed: Mar. 31, 2020

(86) PCT No.: PCT/EP2020/059030
§ 371 (c)(1),
(2) Date: Oct. 8, 2021

(87) PCT Pub. No.: WO2020/207850
PCT Pub. Date: Oct. 15, 2020

(65) Prior Publication Data
US 2022/0169179 A1 Jun. 2, 2022

(30) Foreign Application Priority Data
Apr. 12, 2019 (DE) .................. 10 2019 109 748.7

(51) Int. Cl.
G06T 7/11 (2017.01)
B60R 1/28 (2022.01)
G06T 1/00 (2006.01)

(52) U.S. Cl.
CPC ............. *B60R 1/28* (2022.01); *G06T 1/0007* (2013.01); *G06T 7/11* (2017.01); *B60R 2300/10* (2013.01);
(Continued)

(58) Field of Classification Search
CPC .. G05D 1/0246; G05D 1/0274; G05D 1/0251; G05D 1/0088; G05D 1/024;
(Continued)

(56) References Cited

U.S. PATENT DOCUMENTS 6,556,775 B1 * 4/2003 Shimada ................ H04N 5/272
386/285
2002/0031246 A1 * 3/2002 Kawano .................. G06T 7/194
382/132

(Continued)

FOREIGN PATENT DOCUMENTS

CN 102055917 A 5/2011
CN 104782116 A 7/2015
(Continued)

OTHER PUBLICATIONS

Notification of Reason for Rejection in corresponding Japanese Application No. 2021-560013 (6 pages).
(Continued)

*Primary Examiner* — Quan M Hua
(74) *Attorney, Agent, or Firm* — Osha Bergman Watanabe & Burton LLP

(57) ABSTRACT

An image processing method is operable in an image acquisition system comprising a camera arranged to capture successive images with a field of view, FOV of a portion of an environment surrounding a vehicle, the FOV intersecting a window of the vehicle comprising one or more heater elements that are visible within the FOV of the camera. The method comprises: obtaining an image; determining whether one or more sequences of pixels within the image corresponds to an image of a respective heater element, each pixel within the or each sequence of pixels having a colour and an intensity within respective thresholds; correcting, within the image, the or each sequence of pixels corresponding to a respective heater element by replacing pixel values (Continued)

for the or each sequence of pixels with pixel values derived from pixels which do not correspond with a heater element; and displaying the corrected image.

13 Claims, 3 Drawing Sheets

(52) U.S. Cl.
CPC . *B60R 2300/30* (2013.01); *G06T 2207/30252* (2013.01)

(58) Field of Classification Search
CPC .............. G05D 1/0231; G06T 7/70; G06T 2207/10012; G06T 2207/30252; G06T 2207/10016; G06T 7/11; G06T 2207/20084; G06T 2207/30242; G06T 2207/20081; G06T 7/246; G06T 7/254; G06T 7/215; G06T 7/74; G06T 2207/30236; G06T 7/12; G06T 7/248; G06T 7/292; G06T 5/80; G06T 2207/20021; G06V 20/56; G06V 20/588; G06V 10/82; G06V 10/764; G06V 20/40; G06V 10/25; G06V 20/46; G06V 10/62; G06V 10/273; G06V 10/235; G06V 20/41
See application file for complete search history.

(56) References Cited

U.S. PATENT DOCUMENTS

| | | | |
|---|---|---|---|
| 2009/0316957 A1* | 12/2009 | Chen | G06T 7/215 382/104 |
| 2016/0091714 A1 | 3/2016 | Hui et al. | |
| 2017/0136961 A1* | 5/2017 | Harada | H04N 23/81 |
| 2017/0347405 A1* | 11/2017 | Nagae | H05B 3/84 |
| 2018/0061008 A1* | 3/2018 | Kormos | G06T 5/00 |

FOREIGN PATENT DOCUMENTS

| | | | | |
|---|---|---|---|---|
| DE | 102006010672 A1 | | 9/2007 | |
| EP | 2138352 A1 | | 12/2009 | |
| JP | 2005-106538 A | | 4/2005 | |
| JP | 2010-28203 A | | 2/2010 | |
| JP | 2015113118 A | * | 6/2015 | ............. G03B 17/55 |
| JP | 2017-139654 A | | 8/2017 | |
| JP | 2017-213981 A | | 12/2017 | |
| KR | 2017-0055907 A | | 5/2017 | |
| WO | WO-2016164173 A1 | * | 10/2016 | ............. B60R 11/04 |

OTHER PUBLICATIONS

International Search Report and Written Opinion in corresponding International Application No. PCT/EP2020/059030, mailed Jun. 16, 2020 (11 pages).
German Search Report in corresponding German Application No. 10 2019 109 748.7, dated Jul. 25, 2019 (5 pages).
Notice of Preliminary Rejection in corresponding Korean Application No. 2021-7032747, dated Nov. 18, 2022 (13 pages).
First Office Action in corresponding Chinese Application No. 202080036727.9, dated Jan. 16, 2025 (17 pages).

* cited by examiner

IMAGE PROCESSING METHOD

FIELD

The present invention relates to an image processing method.

BACKGROUND

Currently, vehicles are provided with driver assistance systems which rely on the use of an image acquisition system. Such image acquisition systems can comprise one or more cameras coupled to a processor which can display acquired images on a driver display. The processor may also use such images for the recognition of pavement markings, or three-dimensional objects in a portion of the environment surrounding the vehicle and to assist in the autonomous or semi-autonomous control of the vehicle.

Cameras may be located within the vehicle to capture images of a portion of the environment surrounding a vehicle. Heater elements may be placed on the portion of a windscreen (or window) intersecting a Field of View (FOV) of the camera to reduce fogging or to de-ice the windscreen. Although this may substantially improve the visibility through that portion of the windscreen, such heater elements are captured by the camera and they appear in acquired images as corresponding lines. These lines may undesirably degrade the clarity of the image when the image is displayed or processed.

US 2016/0091714 provides a solution in which the heater element is an inductive type heater element of ferromagnetic material which is located outside of the FOV of the camera. This heater element is configured to direct heat toward a portion of the window that intersects the FOV of the camera. This approach requires modification to the type of heater element as well as a specific arrangement between the heater element and the camera which impacts the overall cost and complexity of the image acquisition system of the vehicle.

SUMMARY

According to a first aspect the application provides a method operable in an image acquisition system to provide a corrected image as claimed in claim 1.

In a second aspect there is provided an image acquisition system configured to perform the method of claim 1.

In still a further aspect, there is provided a computer program product which when executed on a computing device is arranged to perform the method of claim 1.

Advantageous embodiments are provided in the dependent claims.

BRIEF DESCRIPTION OF THE DRAWINGS

An embodiment of the invention will now be described, by way of example, with reference to the accompanying drawings, in which.

DETAILED DESCRIPTION OF THE DRAWINGS

Figure 1:
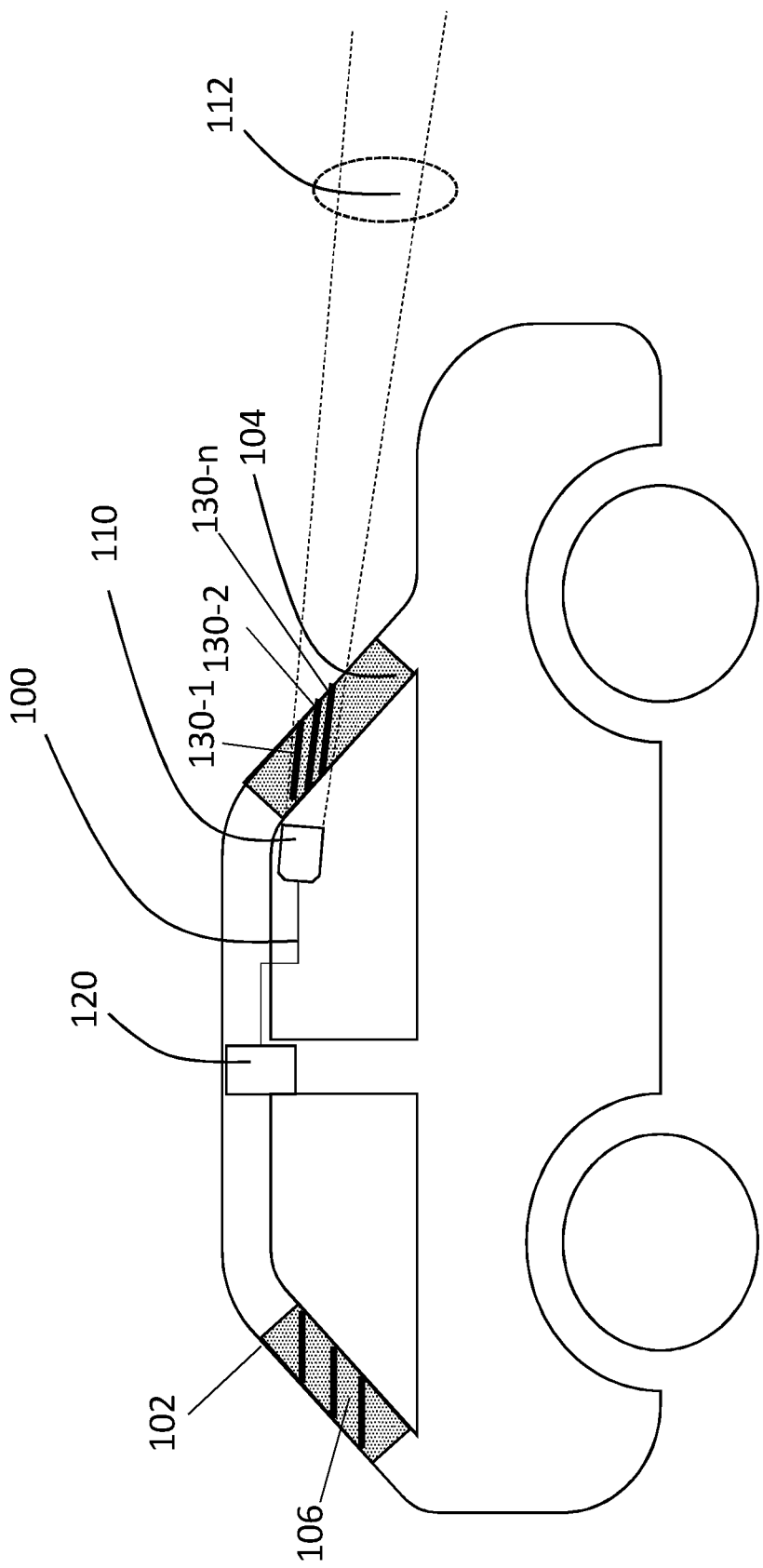
FIG. 1 illustrates a vehicle comprising an image acquisition system for improving the quality of images according to an embodiment of the invention.

FIG. 1 illustrates a vehicle 102 including an image acquisition system 100 for improving the quality of the images according to an embodiment of the present invention. The image acquisition system 100 comprises a camera 110 and a processor 120 for processing images captured by the camera 110. The camera 110 may be any type of image capture device. For example, the camera can be of the type commonly referred to as a digital camera, such as complementary metal-oxide-semiconductor (CMOS) camera, charged coupled device (CCD) camera or the like. The camera 110 can capture images in the visible and/or not visible spectrum, e.g. infrared spectrum, and provide these to the processor 120. The processor 120 processes the image using any combination of chromatic or intensity image plane information provided by camera 110.

In this embodiment, the camera 110 is a front facing camera mounted on a forward-facing surface of a rear-view mirror (not shown) of the vehicle 102. The camera 110 is configured to capture a downward looking plan view of the ground towards the front of the vehicle 102 and through the front windscreen 104 of the vehicle 102. The FOV 112 of the camera 110 intersects a portion of the front windscreen 104 of the vehicle 102 that includes heater elements 130-1 . . . 130-$n$. It is appreciated that the camera 110 may be mounted in any desired location within the vehicle for capturing an image looking in a generally forward direction from the vehicle 102 and through the front windscreen 104 of the vehicle 102. So, for example, the camera 110 could also be located within an overhead console unit (not shown) within the cabin of the vehicle 102.

Alternatively, the camera may be mounted in any desired location within the vehicle 102 for capturing a downward looking plan view of the ground towards the rear of the vehicle 102, or for capturing an image looking in a generally backward direction from the vehicle 102 through the rear windscreen 106. For example, the camera could also be mounted inside the cabin of the vehicle 102 and preferably on the rear windscreen 106. Accordingly, the FOV of the camera intersects a portion of the rear windscreen 106 of the vehicle 102 that includes heater elements similar to the elements 130 on the front windscreen 104.

In the present embodiment, the portion of front windscreen 104 that intersects the FOV 112 of the camera 110 comprises heater elements 130 that are embedded in the glass of the front windscreen 104. Heater elements 130 may alternatively be affixed or formed on the surface of the windscreen to provide the desired function. The heater element may be of an inductive and/or resistive type.

Heater elements 130 comprise one or more linear heater elements 130-1, 130-2, 130-$n$ that are visible within the spectrum of the camera 110. In this embodiment, the heater elements are visible and the camera 110 captures images within the visible spectrum. Alternatively, or in addition, the heater elements may be visible only in the non-visible spectrum, e.g. only when they are heated and the camera may be configured to capture infrared images.

In this embodiment, the heater elements 130-1, 130-2, 130-$n$ are solid lines that extend along a line parallel to the longitudinal axis of the front-windscreen 104 and along substantially the entire length thereof. In alternative embodiments, as explained below, heater elements 130-1, 130-2, 130-$n$ may have different characteristics. For example, heater elements 130-1, 130-2, 130-$n$ may extend completely or partially along an axis of the windscreen and may have any orientation with respect to that axis. Heater elements 130-1, 130-2, 130-$n$ may have any predetermined shape such as zig-zag lines, curved lines, straight lines or any combination thereof; colour; colour intensity; and pattern such as varying thickness or any combination thereof.

Figure 2:
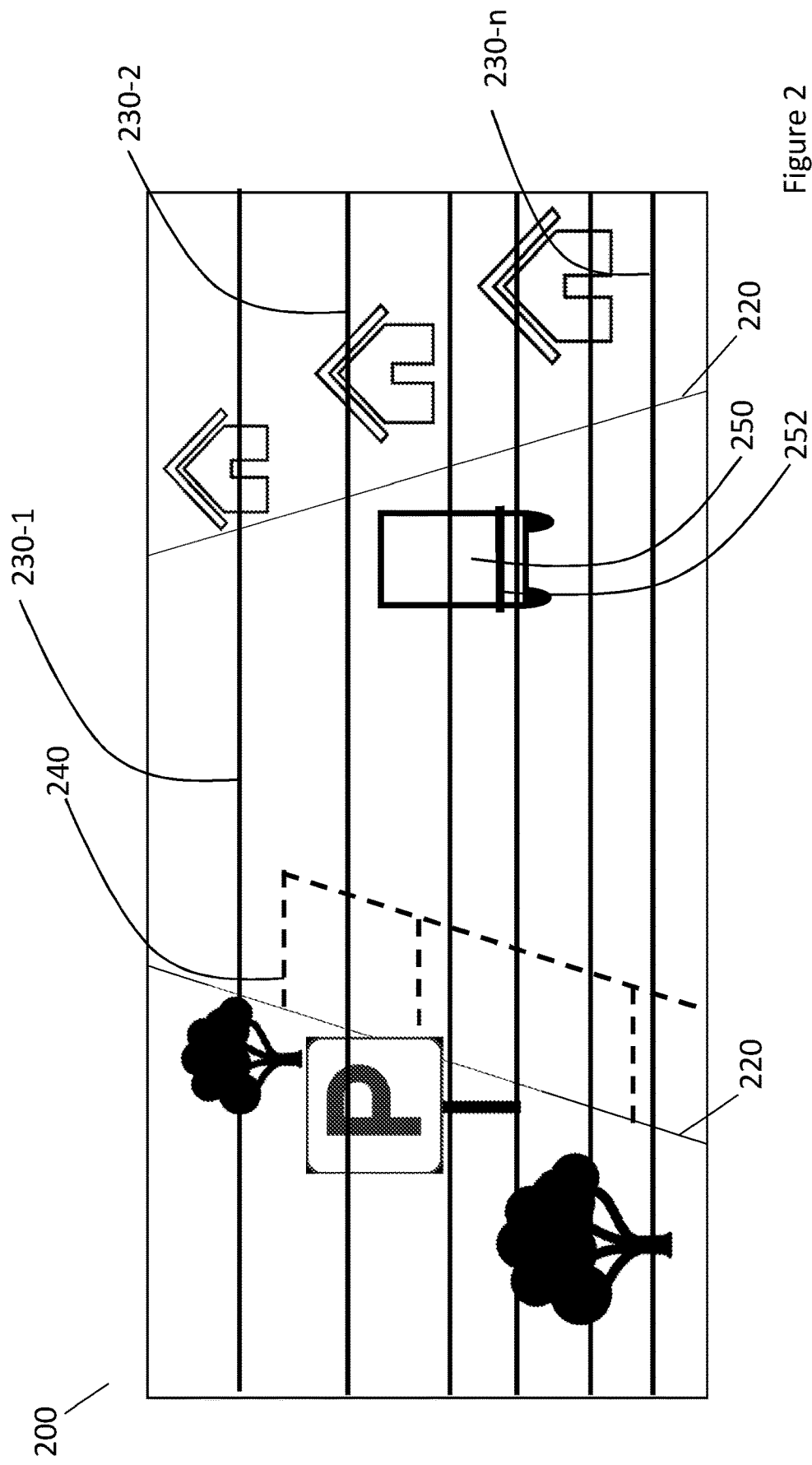
FIG. 2 illustrates an image of a portion of the environment surrounding the vehicle of FIG. 1.

As shown in FIG. 2, heater elements 130-1, 130-2, 130-*n* that intersect the FOV 112 of the camera 110 are visible within the imaging spectrum of the camera 110 and are thus captured by the camera 110 on corresponding lines of the image 230-1, 230-2, 230-*n*. Specifically, heater elements 130-1, 130-2, 130-*n* project on the image plane according to the orientation and angular position of the camera 110 with respect to the front-windscreen 104. In this embodiment, the camera 110 is assumed to be aligned with the front-windscreen 104 so that the corresponding imaged heater lines 230-1, 230-2, 230-*n* extend along respective lines of the image parallel to the longitudinal X-axis of the image 200 and extend along the entire length of the image 200.

In another alternative, the rear windscreen 106 may comprise heater elements as one or more heater lines that may be embedded, formed or affixed on the glass of the rear windscreen 106 to reduce fogging or frosting of that portion of the rear windscreen 106. In this case, the camera is capturing images while looking in a generally backward direction from the vehicle 102 through that portion of the rear windscreen 106. Again, heater elements that are visible within the spectrum of the camera and that intersect the FOV of the camera appear in camera images as corresponding imaged heater lines.

In still further variations, the window of the vehicle through which the camera acquires images can be any one of a side-window or a dedicated window. The window may be made of a transparent, semi-transparent material or a combination thereof that allows images of the surrounding environment to be captured through the window.

In any case, it will be appreciated that image lines corresponding to heater elements may degrade the quality of images when displayed on a driver display (not shown).

Separately, such image artefacts within acquired images can cause problems for driver assistance systems that are based on the analysis of such images.

FIG. 2 is an image 200 of a portion of the environment surrounding the vehicle 102. The portion of the environment surrounding the vehicle 102 comprises lane markings such as edge lines 220 that delimit the pavement on which the vehicle 102 can navigate, as well as parking lines 240. Image lines 230-1, 230-2, 230-*n* may be processed as potential features of an image 200. For example, the system may treat one or more pixels of the image lines 230-1, 230-2, 230-*n* as parking lines 240.

In the present image acquisition system 100, the processor 120 is tasked with detection and removal of the imaged heater lines 230-1, 230-2, 230-*n* prior to displaying the corrected images on the driver display. Additionally, the processor 120 may perform parking assist function and/or autonomous or semi-autonomous driving such as active cruise control or indeed any other vehicle function. Alternatively, the processor 120 could comprise a dedicated processor for detecting and removing the imaged heater lines 230-1, 230-2, 230-*n*; or indeed the processor 120 could comprise any processor of a multiple processor core within a vehicle control system and which may be available as required for improving acquired images.

In any case, the processor 120 is programmed to process the digital image data representative of the images captured by the camera 110 to detect the defect pixels within the images corresponding to imaged heater lines 230-1, 230-2, 230-*n* and to correct the defect pixels within the images.

Figure 3:
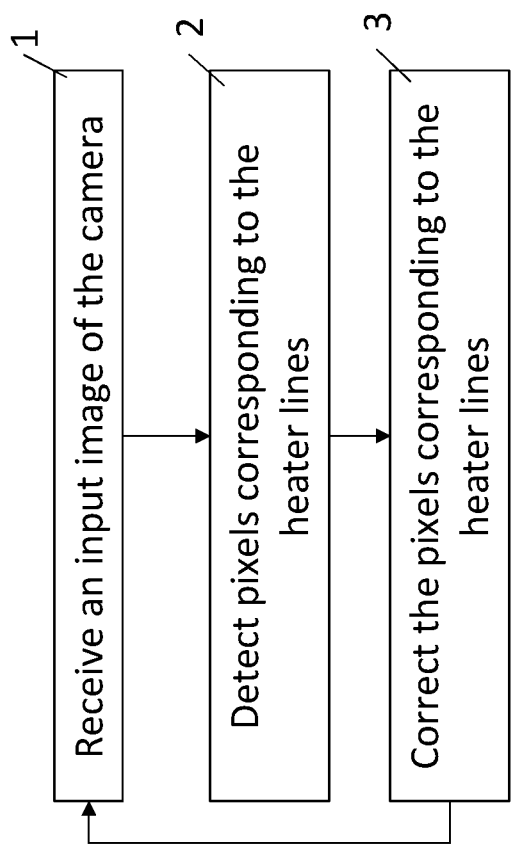
FIG. 3 is a block diagram illustrating a method for improving the quality of images according to an embodiment of the invention.

Referring now to FIG. 3 there is shown a block diagram illustrating an image processing method for improving acquired images according to an embodiment of the invention.

In step 1, an image 200 from the camera 110 is fed to the processor 120 of the image acquisition system 100. The image 200 comprises one or more imaged heater lines 230-1, 230-2, 230-*n* corresponding to respective heater elements 130-1, 130-2, 130-*n*. (Note that in practice, the image 200 corresponds with a region of interest (ROI) selected from within the FOV 112 of the camera 110 and which has been transformed into a flattened rectangular image of the scene.)

In step 2, the processor 120 detects the pixels within the image 200 corresponding to heater elements 130-1, 130-2, 130-*n* by scanning the image to detect any sequences of adjacent pixels in a horizontal line (row) of the image that have characteristics that correspond to predetermined characteristics of an imaged heater line. In the embodiment, the processor 120 determines whether each pixel within the sequence of pixels has a colour within a given threshold and an intensity below a given threshold. In the embodiment, the colour threshold corresponds with a pre-determined chromaticity for imaged heater lines, for example, black (the lowest chromaticity values) and the intensity is low. Nonetheless, it will be appreciated that other heater lines can have a strong non-black chromaticity component such as an orange hue and appropriate thresholds can be set to determine if a pixel has this colour.

It will therefore be appreciated that it can be beneficial for image information to be supplied to the processor 120 in an intensity/chromaticity format such as YUV or LAB space, so that intensity can be checked first against a scalar value, before checking chromaticity only in the case of pixels satisfying the intensity threshold.

Thus, if a given pixel (pixel[x]) in an image line and the consecutive pixel (pixel[x+n] where n≥1) are of a given colour and dark, the first and consecutive pixel meet the criteria. In response, a counter is incremented by a unit. This process is repeated for a plurality of consecutive pixels in an image line until a minimum threshold is reached. The minimum threshold is a predetermined threshold that is lower than the total number of pixels in an image line of the image 200. For example, in this embodiment, the image width is 1024 pixels and the maximum value of the minimum threshold is 1023 (image width —1). When the counter reaches the minimum threshold of pixels meeting the criteria, it is determined that the sequence of pixels corresponds to an imaged heater line 230. The process continues along the image line until the last adjacent pixel satisfying the colour/intensity criteria is detected. All pixels along the imaged heater line are then marked accordingly for subsequent correction.

For example, in FIG. 2 the processor 120 determines that a first pixel of the image line 230-1 is black and its intensity is within a predefined intensity threshold. The first pixel is thus categorised as a potential pixel of an image line 230-1 corresponding to the heater element 130-1. The processor selects a consecutive pixel on the image line and determines that the consecutive pixel is black and its intensity is within the predefined intensity threshold. The consecutive pixel is thus categorised as another potential pixel of the image line 230-1 and the processor increases the counter value. Once the counter reaches the minimum threshold, it is determined that the sequence of pixels (as well as any further adjacent heater line pixels on that line) corresponds to the imaged heater line 230-1 representative of the corresponding heater element 130-1.

In contrast if the first pixel that is categorised as a potential pixel of an image line 230-1 is a pixel of parking line 240, at least one subsequent pixel in the line will not have a colour and intensity within the corresponding threshold(s) before the counter reaches its minimum threshold. Consequently, the sequence of pixels would not be categorized as representative of an imaged heater line. The process would thus be repeated starting from a subsequent pixel, as long as the remaining number of pixels in a line were greater than the threshold number of pixels required for an imaged heater line.

Similarly, if the first pixel that is categorised as a potential pixel of an image line 230-1 is of a rear bumper 252 of a truck 250, at least one consecutive pixel would not have colour and intensity within the corresponding threshold before the counter reaches the minimum threshold. Thus, the sequence of pixels would not be categorized as representative of an imaged heater line. Again, the process would thus be repeated starting from a subsequent pixel, as long as the remaining number of pixels in a line were greater than the threshold number of pixels required for an imaged heater line. (As such, it will be seen that if the threshold is high, only a fractional number of pixels within any given image will need to be tested to determine if they belong to an imaged heater line.)

In step 3, the one or more sequences of pixels within the image 200 identified as corresponding to imaged heater lines 230-1, 230-2, 230-*n* in step 2 are corrected. Specifically, in the embodiment, the processor 120 uses information from pixels neighbouring the pixels identified as corresponding to imaged heater lines 230-1, 230-2, 230-*n* to correct the pixels corresponding to imaged heater lines 230-1, 230-2, 230-*n*.

In a simple implementation, this may be performed by locating for each pixel of each imaged heater line 230-1, 230-2, 230-*n* the nearest pixel that does not belong to the corresponding imaged heater line and assigning the nearest pixel value to the value of the pixel of the imaged heater line.

Alternatively, the correction may be performed using averaging, linear or polynomial extrapolation of a plurality of adjacent pixels or interpolation of pixels surrounding the pixel belonging the imaged heater line.

So, where a given pixel from an imaged heater line is adjacent other pixels from an imaged heater line, it may be desirable to extrapolate image information from non-heater line pixels disposed on one side of the given pixel.

On the other hand, if an imaged heater line runs along only one or a minimal number of rows of a given image, it may be more suitable to interpolate or average image information from pixels above and below the image row corresponding to the imaged heater line.

So, even if an imaged heater line occupied more than one adjacent row of an image, it would still be possible to interpolate image information from either side of the imaged heater line, by weighting the interpolated pixel information according to its distance from a given heater line pixel.

Each of these implementations comprises a generally linear type correction of a given image, however, it will be appreciated that using a suitably trained classifier, pixels from within a given image could be used to correct the defect pixels in a non-linear fashion, so allowing for a potentially more intelligent correcting of the image.

Once complete, the image corrected according to step 3 can be provided for display on a driver display and possibly provided to other applications or processing modules for use in driver assistance systems.

The process may then be repeated for successive images in a stream of images as required.

It will be appreciated that still further variations of the above described embodiment are possible.

For example, the above embodiment makes no assumptions about the location of imaged heater lines within any acquired image, only that adjacent pixels of an imaged heater line are expected on the same row of an image. This enables the location of imaged heater lines to change as may happen in response to changing environmental conditions.

In alternative embodiments, the system may be calibrated once when installed in a vehicle by first capturing a blank image, for example, of a white card. Then, any pixels not identified as being white in an acquired calibration image could be marked as comprising imaged heater lines. The would avoid the need to scan each acquired image as described above in relation to step 2.

The processor 120 would then only need to correct pixels within subsequent images acquired during operation of the vehicle based on the location of the such pixels identified as corresponding to imaged heater lines at calibration time.

More sophisticated approaches to identifying such pixels can involve feeding successive acquired images to a classifier which identifies rows of pixels within acquired images whose chromaticity and intensity are substantially time invariant as corresponding to imaged heater lines. Such classifiers can comprise any suitable classifier including a neural network-based classifier.

Indeed, such classifiers can provide a non-binary map for pixels corresponding to imaged heater lines, with some pixels having a higher probability of being imaged heater line pixels than others and so possibly signalling that a varying degree of correction might be applied to different pixels of imaged heater lines.

It will also be appreciated that while the above described embodiment has been described in terms of correcting an image based on information from within the image itself, it may also be possible to extract image information from one or more immediately previously acquired images, or possibly even subsequently acquired images (if available before display of a given previously acquired image), and using vehicle odometry, determine image information from such images, which is occluded by the heater elements 130 in a given image but not occluded in the other acquired images to correct the pixels within the given image.

Finally, the above described embodiment has been described on the assumption that heater elements are linear and horizontal within each acquired image. On the other hand, if such elements have more complicated shapes, then the scanning path through an image to identifying adjacent pixels along an imaged heater line might be more complex than simply advancing along a row of an image. The shape, pattern and/or orientation of such imaged heater lines can be stored in a memory accessible to the processor 120, enabling the processor once it has discovered one or more adjacent pixels of an imaged heater line to determine where a next expected pixel of the imaged heater line should be located.

It will also be appreciated that in some implementations, the heater elements need not be continuous and again, this can be taken into account by the processor 120.

The invention claimed is:

1. An image processing method for an image acquisition system of a vehicle, the image acquisition system comprising a camera arranged to capture successive images with a field of view (FOV) of a portion of an environment surrounding the vehicle, said FOV intersecting a window of the vehicle comprising one or more heater elements that are visible within the FOV of the camera, the method comprising:

obtaining an image;

determining whether one or more sequences of pixels within the image corresponds to an image of a respective heater element, each pixel within the one or more sequences of pixels having a colour and an intensity within respective thresholds, wherein determining whether the one or more sequences of pixels within the image corresponds to an image of a respective heater element comprises:

determining a shape of the one or more heater elements, and performing scanning of the one or more sequences of pixels within the image along a scanning path corresponding to said shape, and wherein determining the shape of the respective heater element comprises calibrating the image acquisition system by:

capturing an image of a scene with a constant colour, marking pixels not identified as being of said constant colour as pixels of the one or more heater elements, determining said shape corresponding to a distribution of pixels of the one or more heater elements, and storing said shape in a memory and/or retrieving the shape of the respective heater element from the memory;

correcting, within the image, the one or more sequences of pixels corresponding to a respective heater element by replacing pixel values for the one or more sequences of pixels with pixel values derived from pixels which do not correspond with a heater element; and displaying said corrected image.

2. The method of claim 1, further comprising providing one or both of said image and said corrected image to a driver assistance system.

3. The method of claim 1, wherein the one or more heater elements has a linear shape.

4. The method of claim 3, wherein the image of the one or more heater elements extends along a respective line of the image parallel to a longitudinal X-axis of the image and extends along an entire length of the image.

5. The method of claim 1, wherein performing scanning of the one or more sequences of pixels within the image along a scanning path that fits within said shape comprises:

a) in response to determining that a given pixel[i] and a consecutive pixel[i+n], where n≥1, of the one or more sequences of pixels along the scanning path have colour and intensity within the respective thresholds, incrementing a counter by a unit;

b) repeating the determining step (a) for a plurality of consecutive pixels along the scanning path; and c) determining that the one or more sequences of pixels within the image corresponds to an image of a respective heater element when a minimum threshold of the counter is reached.

6. The method of claim 5, further comprising:

d) repeating step (b) until a last pixel within the one or more sequences of pixels along the scanning path has a colour and an intensity within the respective thresholds; and e) marking each pixel within the one or more sequences of pixels for subsequent correction.

7. The method of claim 1, wherein the image corresponds with a region of interest, ROI, selected from within the FOV of the camera and which has been transformed into a flattened rectangular image of a scene.

8. The method of claim 1, wherein the pixels which do not correspond with a heater element are pixels neighbouring the pixels within the image that correspond to the image of the respective heater element.

9. The method of claim 1, wherein replacing pixel values for the one or more sequences of pixels with pixel values derived from pixels which do not correspond with a heater element comprises:

interpolating pixel values from pixels located on either side of the image of a respective heater element, and wherein interpolating comprises weighting the interpolated pixel values according to a distance from a given pixel of a respective heater element; or averaging pixel values from pixels located on either side of the image of a respective heater element; or extrapolating pixel values from pixels located on one side of the image of a respective heater element; or selecting using a suitably trained classifier, pixels from within the image to correct the defect pixels in a non-linear fashion.

10. An image acquisition system having a camera, a memory and a processor configured to perform the method of claim 1.

11. The image acquisition system of claim 10, wherein the camera captures an image in a visible and/or not visible spectrum.

12. A vehicle comprising: an image acquisition system as defined in claim 10; and a window comprising one or more heater elements that are visible within the FOV of the camera.

13. A non-transitory computer program product which when executed on a computing device is arranged to perform the method of claim 1.

* * * * *